United States Patent [19]
Meier

[11] 3,779,072
[45] Dec. 18, 1973

[54] MEASURING APPARATUS INCLUDING IMPROVED STRING MOUNTING MEANS

[76] Inventor: Eugen Meier, Wampflenstrasse 45, Meilen, Switzerland

[22] Filed: June 5, 1972

[21] Appl. No.: 259,854

[30] Foreign Application Priority Data
July 6, 1971  Switzerland.......................... 9877/71

[52] U.S. Cl. .............................. 13/141 R, 73/DIG. 1
[51] Int. Cl. .............................................. G01l 1/10
[58] Field of Search ...................... 13/141 A, 141 R, 13/DIG. 1, 517 AV, 505, 67.2

[56] References Cited
UNITED STATES PATENTS
| | | | |
|---|---|---|---|
| 3,470,400 | 9/1969 | Weisbord..................... | 73/88.5 R X |
| 3,411,347 | 11/1968 | Wirth et al........................ | 73/141 R |
| 3,465,597 | 9/1969 | Riordan et al. ................. | 73/517 AV |

Primary Examiner—Charles A. Ruehl
Attorney—Lawrence E. Laubscher

[57] ABSTRACT

A load measuring apparatus of the type in which the variation in tension of a pre-stressed electronically-excited string element produces a variation in oscillation frequency that is a function of the parameter to be measured, characterized by the provision of a pair of mounting means for connecting the ends of the string element with the fixed and movable components of the apparatus, respectively, in such a manner that the string is decoupled against vibration in at least one transverse direction. Each of said mounting means is designed for flexure about a first axis normal to the longitudinal axis of the string element, the first axes of flexure and the longitudinal axis of the string element being contained in a common first plane. In accordance with an alternate embodiment, each mounting means also contains a second axis of flexure normal to the axis of the string element, said second axes and the string element axis being contained in a second plane normal to the first plane.

5 Claims, 4 Drawing Figures

MEASURING APPARATUS INCLUDING IMPROVED STRING MOUNTING MEANS

This invention relates generally to string-type measuring apparatus, such as dynamometers and extensometers, wherein a pre-stressed measuring string element that is connected between movable and fixed components of the apparatus is electronically excited to oscillate transversely, the change in oscillation frequency resulting from variation in string tension being a function of the parameter to be measured.

In order to achieve suitable precision of measurement, it is important that a high quality of oscillation be achieved (i.e., the frequencies must be of a high constancy). Sharp resonant frequencies are preferred and can be achieved only by efficient decoupling of the string element from the various components of the apparatus, whereby the deleterious effects of external influences on the vibrating string element are eliminated.

Accordingly, a primary object of the present invention is to provide an improved measuring apparatus including string decoupling means designed to operate as well in a passive sense (i.e., "passive decoupling") to protect the string from undesirable external vibratory forces (for example, marginal location excitation), as in an active sense (i.e., "active decoupling") to reduce the power loss caused by damping, thereby to improve the stability of the string oscillations. More particularly, the string decoupling means include a pair of mounting means for connecting the ends of the string element with the fixed and movable components of the apparatus, respectively, each of said mounting means containing an intermediate first axis of flexure normal to the longitudinal axis of the string element, the first flexure axes and the longitudinal axis of the string element being contained in a common first plane. Preferably, each of the mounting means comprises a mounting member containing a first intermediate reduced portion having a rectangular cross-section the longer dimension of which defines the first axis of flexure. Consequently, the string element is supported in one plane by a relatively weak resilient suspension, thereby affording extreme decoupling and damping reduction. Only in the longitudinal direction is the string coupled in a relatively strong resilient suspension. A more specific object of the invention is to provide string measuring apparatus of the type described above, wherein in addition to the aforementioned first axis of flexure, each of the string mounting means includes a second axis of flexure, thereby assuring relatively complete decoupling of the string element against external vibratory effects. The second axes of flexure are contained in a second plane that also contains the longitudinal axis of the string and is normal to said first plane. This embodiment of the invention offers the further advantage that when coil springs are used as a connecting means between the string and the movable component of the apparatus, the mounting means also rotate, upon extension, with the end of the coil springs adjacent the string without noticeably affecting string performance.

A further object of the present invention is to provide measuring apparatus of the type described above wherein the string and mounting means are preferably formed of unitary one-piece construction, thereby simplifying assembly (since it is no longer necessary to secure the parts together by welding, soldering or clamping), and furthermore the parts can be more precisely arranged relative to each other, whereby assembly errors are eliminated. Adjustment is generally eliminated, and better reproduction of the dimensions and characteristics of the string can be achieved. Depending on the particular requirements, additional weights may be provided adjacent the junction points between the string element and the mounting means, which weights can easily be attached by screwing, soldering, welding, gluing or crimping.

In accordance with another object of the invention, the decoupling mounting means can be used in connection with string elements of circular cross-section. It was previously believed that strings of circular cross-section were less suitable for use than strings of other cross-section (i.e., of rectangular cross-section) for applications that require that the oscillations be of high stability. As experiments have shown, however, with satisfactory decoupling it is also possible to use strings of circular cross-section if the cross-section to some extent approximates to the ideal circularity. This is quite possible with modern manufacturing methods. Thus, for example, an advantageous method of production provides that the string according to the invention is produced from a wire using a centerless grinding method. This in itself produces very good results as regards a substantially circular cross-section, and these results can be still further improved by subsequent electrolytic polishing.

Strings of circular cross-section have the advantage that, if the assembly is not made in one piece, connecting the string to the junction weights usually raises fewer problems than in the case of strings which are of a non-circular cross-section. Also, it is known that a circular cross-section is superior to other cross-sectional shapes as regards its mechanical properties for example strength, and as regards damping by the ambient medium. In the case of circular cross-section strings, the transition from the string cross-section to the adjacent junction points which are preferably also circular in cross-section, is advantageously made such as to provide a steady merging of the diameters, preferably such that the surface contour line is at least approximately parabolic. The resulting conditions are particularly favourable from the point of view of stress and strength. Also, with this construction, the effective string length is generally not subject to fluctuations which are difficult to calculate, for example due to imprecisions when fixing the string, but is specifically established; consequently, no adjustment is necessary. Virtually all marginal location interference can be avoided in this way, and notch effects cannot occur.

Other objects and advantages of the invention will become more apparent from a study of the following specification when viewed in the light of the accompanying drawing, in which.

Figure 1:
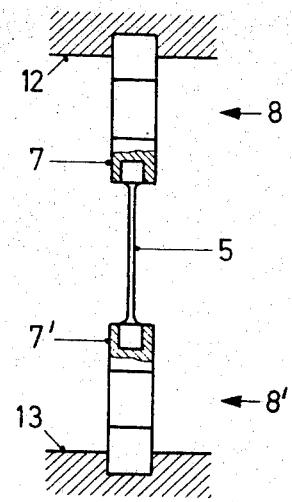
FIG. 1 is a partially sectioned front elevational view of a first embodiment of the string.
Figure 2:
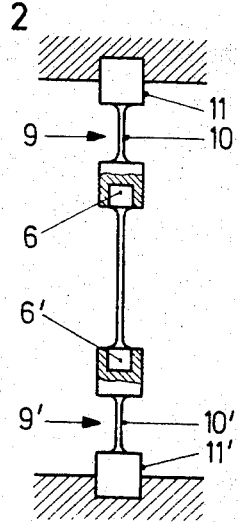
FIG. 2 is a side elevation view, in partial section, of the embodiment shown in FIG. 1.

Referring first to FIGS. 1 and 2, the measuring string comprises a round string element 5 the end portions 6, 6' of which are fitted and soldered within suitable bores in junction weights 7 and 7'. The junction weights 7 and 7' are each a part of mounting members 8 and 8', respectively. Each mounting member 8 and 8' is in the form of a flexible link and comprises an intermediate portion 9 and 9', respectively, which is reduced to a rectangular cross-section (as indicated by 10 and 10'), and end portions 11 and 11' at the ends remote from the string 5, said end portions being of full cross-section and connected by solder means to a fixed part, such as a mounting bracket 12, and to a connecting member 13 connected with the movable measuring part of the device, respectively. Thus, the force to be measured is transmitted to the string 5 by way of the connecting member 13. Bracket 12 and connecting member 13 are of conventional construction and are not part of the present invention.

The reduced portions 9 and 9' thus provide a coupling between the string and the fixed and movable parts 12 and 13, respectively, which coupling is of relatively strong resilience in the longitudinal direction and in the direction of one transverse plane, whereas in the direction of a second transverse plane, normal to the first plane, there is a relatively soft resilient coupling which already provides a substantial improvement in the quality of string oscillation by partially isolating the string from the parts of the device.

Figure 3:
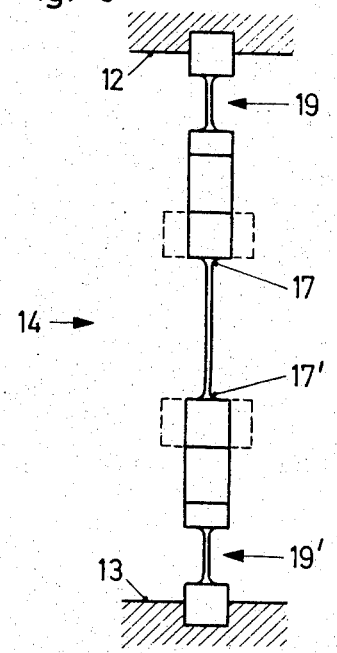
FIG. 3 illustrates in partially sectioned front elevational view of a second embodiment.
Figure 4:
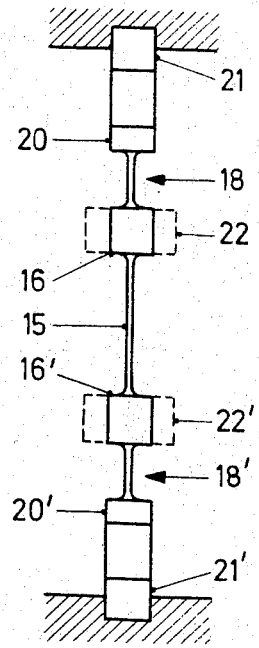
FIG. 4 is a side elevational view of the embodiment shown in FIG. 3.

In FIGS. 3 and 4, the round string 15, the junction points 16 and 16' and the mounting members (formed by portions 16 and 16' 18 and 18', 19 and 19', 20 and 20' and 21 and 21', respectively) consist of a single unitary member 14. The string element 15 ends in the junction points 16 and 16', while uniform, substantially parabolic transitions 17 and 17' lead from the circular cross-section of the string 15 to the circular cross-section of the larger junction points 16 and 16'. Connected with each of the junction points, respectively, is a flexible cross link comprising the portions of reduced section 18 and 18', 19 and 19', and intermediate portions 20 and 20'. The ends of the unitary member 14 are soldered into the bracket 12 and the measuring member 13, respectively, by means of round end portions 21 and 21'. A weight ratio of string to junction points of about 1,000 has been found desirable (for example, string about 4.5 mg. junction points about 4.5 g). In order to achieve this, additional weights 22 and 22' are fitted to the junction points 16 and 16' of the member 14, preferably by welding or soldering. Pressing or crimping of rings onto the junctions points is also a suitable method.

When using the embodiment shown in FIGS. 3 and 4, tests have shown that under conditions which are otherwise identical, in comparison with a construction without the decoupling provided by the flexible links, in which six interference resonances occured in the measuring range, a completely stable and practically interference-free frequency performance was now achieved.

The two embodiments described above have bending links in one plane, or in two planes perpendicular to each other, respectively. It is readily possible, for example, to use bending links with three reduced-section portions each displaced through 120°, but this should be necessary only in exceptional cases. The bending links can also be of circular cross-section. In this case, according to the cross-section, correspondingly longer holding members are required for good decoupling.

The above-described measuring strings in accordance with the invention are suitable for single and also multiple string arrangements. In the latter case, the arrangement also enjoys the advantage of good mutual decoupling of both strings, for example with identical string frequencies.

While in accordance with the Patent Statutes, the preferred form and embodiments of the invention have been illustrated and described, it will be apparent that various changes and modifications may be made without deviating from the inventive concept.

What is claimed is:

1. In a load measuring apparatus of the type in which the variation in tension of a pre-stressed electronically excited string element produces a variation in oscillation frequency that is a function of the parameter to be measured, the improvement which comprises
   a. a string element having throughout its length a generally circular cross-sectional configuration; and
   b. a pair of flexible mounting means for connecting the ends of said string element with the stationary and movable components of said apparatus, respectively,
      1. each of said mounting means including a mounting member containing intermediate its ends longitudinally-displaced orthogonally-arranged first and second reduced portions of rectangular cross-section, respectively, the first and second reduced portions of said mounting members being contained in first and second orthogonally arranged planes each of which is common with the longitudinal axis of said string element, respectively,
      2. each of said mounting members further including a transition portion connecting the associated end of the string element with said mounting member, the peripheral surface of said transition portion being rotationally symmetrical and merging smoothly from the periphery of the string element to said mounting member, whereby the string is decoupled at each end from the apparatus in two orthogonally arranged directions.

2. Apparatus as defined in claim 1, wherein said string and mounting members are formed from a single unitary body.

3. Apparatus as defined in claim 1, wherein said transition portion has a generally parabolic longitudinal contour.

4. Apparatus as defined in claim 3, wherein each of said mounting members has a generally circular cross-section.

5. Apparatus as defined in claim 1, and further including a pair of additional weight means arranged on the ends of said mounting members adjacent the string element, respectively.

* * * * *